Patented May 12, 1931

1,805,199

UNITED STATES PATENT OFFICE

GELLERT ALLEMAN, OF WALLINGFORD, PENNSYLVANIA, ASSIGNOR TO SUN OIL COMPANY, OF PHILADELPHIA, PENNSYLVANIA, A CORPORATION OF NEW JERSEY

PREPARATION OF COLLOIDAL METAL

No Drawing.   Application filed December 11, 1929.  Serial No. 413,433.

This invention relates to the preparation of colloidal metal which is in such state as to be particularly adapted for introduction into the cylinder of an internal combustion engine of the high compression type, by solution in the fuel or otherwise, to eliminate knocking.

This application is a continuation in part of my application Serial Number 333,513, filed January 18, 1929.

In the application referred to, there are disclosed methods of preparing alkyl derivatives of metals and more specifically amyl derivatives of lead. It is found that decompositions of these derivatives yield colloidal metals in such fine state of subdivision as to exert a maximum effect in suppressing knocking.

It is accordingly the object of the present invention to provide a method of preparing colloidal metals, and specifically colloidal lead, having particularly desirable characteristics for incorporation into fuel or for other introduction into an internal combustion engine.

Reference may be made to my application above referred to and to my application Serial Number 333,512, filed the same date, for preferred methods of preparing the derivatives found most suitable for the preparation of the colloidal metals. There will first be described preferred methods of preparing colloidal metals after which the numerous possible variations of the methods will be set out.

The amyl derivatives of lead are found most suitable for the preparation of colloidal lead, either the tetra amyl derivatives (containing the same or mixed amyl radicals) or the mixed amyl derivatives such as amyl-methyl, amyl-ethyl, amyl-propyl, etc., derivatives being usable. These mixed derivatives may be of the mono-tri or di-di type or they may contain three or four different alkyl groups. The results from di-methyl-didiethylmethyl lead appear to be best so that the preparations from this derivative will be specifically described.

Briefly stated, the colloidal metals are produced by the decomposition of the alkyl derivatives by heat. The dimethyl-didiethyl-methyl lead decomposes about 188° C. with separation of considerable quantities of colloidal lead. In fact, during such decomposition (produced by dropping the dimethyl-didiethylmethyl lead into a tube maintained at 188° C.), the lead separating in the colloidal state exceeds the amount separating in a larger state of aggregation.

Instead of heating the lead derivative alone, as indicated above, it may be heated in solution in a solvent which is inert so far as effect upon the colloidal metal is concerned: that is, the solvent must not be of a character which will produce aggregation of the colloidal particles or which will act chemically upon them. As an example of this process, 1.5 cc. of dimethyldidiethyl-methyl lead were added to 25 grams of diphenyl, the solution being heated to 230° C. to insure complete decomposition. When 188° C. was reached marked decomposition occurred and a material boiled off, probably consisting of hydrocarbon substances resulting from the decomposition. Instead of using diphenyl as the inert solvent, other substances such as aliphatic or aromatic hydrocarbons or their derivatives may be used, the properties which render them suitable being inertness with respect to the colloidal metal and stability and maintenance of the liquid phase at the decomposition temperature of the derivative.

The advantages of the formation of the colloidal metals in such inert liquids are considerable. First, the proportion of colloidal metal to metal in a larger state of aggregation formed in the decomposition is greater, probably due to the dilution of the derivative, resulting in more uniform heating; secondly, the suspension of the colloidal metal in the solvent may be added directly to the fuel, the colloidal metal being at all times protected from the oxidizing action of the air. In fact the suspension may be kept for very considerable periods without oxidation or settling out of metal due to aggregation of the particles.

In addition to the methods outlined above, the colloidal metal may be formed directly in the fuel (or a portion thereof) in which it is ultimately to be used. To effect this process, the derivative of lead or other metal is dissolved in the fuel, such as gasoline, the solution being then boiled, the vapors being condensed and returned by means of a reflux condenser. To secure rapid decomposition to form colloidal metal, the mixed vapors of the derivative and solvent are heated by means of an electric heating coil or the like to a temperature above the decomposition temperature. In this way the decomposition is effected in the vapor phase. In carrying out this process, it is desirable to exclude air or carbon dioxide and to avoid prolonged boiling of the suspension of colloidal metal formed as aggregation of the colloidal metal into larger particles is apt to occur.

In carrying out the preparations of colloidal metals by decomposition of the derivatives, it is found that the temperature and rapidity of heating markedly influence the character, the size and the activity of the resulting colloidal metal when used to suppress knocking. It appears that rapid heating resulting in sudden or quick decomposition yields small and very active colloidal particles which remain in suspension for a long time, whereas prolonged moderate heating yields larger and less active colloidal particles which settle out on long standing.

In order to determine the anti-knock effect of colloidal metals, the metals, if produced by decomposition of the derivatives alone, may be shaken up in purified gasoline having pronounced or definite knocking effects and the product filtered through a fine filter. If the colloidal metal is produced in a solvent, the suspension is added to the fuel and filtered. The colorless and apparently clear filtrates thus obtained exhibit the Tyndall effect and when used in an engine are found to have a high anti-knock value. Other colloidal metals, for example, thallium and nickel, exhibit similar effects.

The active colloidal particles thus produced appear to have sizes (apparent diameters) between $10^{-7}$ cm. to $10^{-5}$ cm. ($1.0\mu\mu$ to $0.1\mu$). At any rate the particles of these sizes appear to exert most effective action.

While particular reference has been made herein to amyl derivatives of lead, similar results are obtained by using amyl or other derivatives of other elements such as thallium or nickel, or by using other than amyl derivatives of lead, the best results being obtained, however, with derivatives of high molecular weight as represented by the butyl, amyl, benzyl, etc. derivatives.

After using fuel containing colloidal lead prepared as above described in an engine, the anti-knock effect remained although newly introduced fuel containing no anti-knock material was introduced. This result was similar to that discussed in my prior application referred to above.

What I claim and desire to protect by Letters Patent is:

1. The method of preparing colloidal metal including decomposition of an amyl derivative of the metal by heat.

2. The method of preparing colloidal metal including decomposition of a diethylmethyl derivative of the metal by heat.

3. The method of preparing colloidal lead including decomposition of an amyl derivative of lead by heat.

4. The method of preparing colloidal lead including decomposition of a diethylmethyl derivative of lead by heat.

5. The method of preparing colloidal lead including decomposition of a didiethylmethyl derivative of lead by heat.

6. The method of preparing colloidal lead including decomposition of dimethyldidiethylmethyl lead by heat.

7. The method of preparing colloidal metal including decomposition of an amyl derivative of the metal in solution in an inert solvent, by heat.

8. The method of preparing colloidal metal including decomposition of a diethylmethyl derivative of the metal in solution in an inert solvent, by heat.

9. The method of preparing colloidal lead including decomposition of an amyl derivative of lead in solution in an inert solvent, by heat.

10. The method of preparing colloidal lead including decomposition of a diethylmethyl derivative of lead in solution in an inert solvent, by heat.

11. The method of preparing colloidal lead including decomposition of a didiethylmethyl derivative of lead in solution in an inert solvent, by heat.

12. The method of preparing colloidal lead including decomposition of dimethyldidiethylmethyl lead in solution in an inert solvent, by heat.

In testimony of which invention, I have hereunto set my hand, at Wallingford, Pennsylvania, on this 7th day of December, 1929.

GELLERT ALLEMAN.